(12) United States Patent
Kormann et al.

(10) Patent No.: US 7,430,845 B2
(45) Date of Patent: Oct. 7, 2008

(54) HARVESTING MACHINE WITH A MEASURING DEVICE FOR CAPTURING THE THROUGHPUT OF COLLECTED CROP MATERIAL

(75) Inventors: Georg Kormann, Zweibrücken (DE); Nico Correns, Weimar (DE); Michael Rode, Jena (DE)

(73) Assignee: Deere & Company, Moline, IL (US)

( * ) Notice: Subject to any disclaimer, the term of this patent is extended or adjusted under 35 U.S.C. 154(b) by 195 days.

(21) Appl. No.: 11/300,132

(22) Filed: Dec. 14, 2005

(65) Prior Publication Data

US 2007/0130900 A1    Jun. 14, 2007

(51) Int. Cl.
*A01D 41/127* (2006.01)

(52) U.S. Cl. ............... 56/10.2 R; 56/10.2 C; 460/1; 460/4

(58) Field of Classification Search ............... 460/1, 460/4, 5; 177/16; 56/10.2 R, 10.2 C; 73/861.73
See application file for complete search history.

(56) References Cited

U.S. PATENT DOCUMENTS

| | | | | |
|---|---|---|---|---|
| 3,563,013 | A | * | 2/1971 | Elfes ............................... 460/5 |
| 3,939,846 | A | * | 2/1976 | Drozhzhin et al. ............. 460/1 |
| 4,360,998 | A | * | 11/1982 | Somes ........................... 460/5 |
| 4,407,380 | A | | 10/1983 | Elder |
| 4,490,964 | A | * | 1/1985 | Eldredge ........................ 460/5 |
| 5,318,475 | A | | 6/1994 | Schrock et al. |
| 5,561,250 | A | | 10/1996 | Myers ....................... 73/861.73 |
| 5,575,316 | A | * | 11/1996 | Pollklas ....................... 141/198 |
| 5,959,218 | A | * | 9/1999 | Strubbe .................... 73/861.73 |
| 5,959,257 | A | | 9/1999 | Campbell et al. |
| 6,066,809 | A | | 5/2000 | Campbell et al. |
| 6,313,414 | B1 | | 11/2001 | Campbell |
| 6,584,424 | B2 | | 6/2003 | Hardt |
| 7,165,440 | B2 | * | 1/2007 | Umeda ........................ 73/1.39 |
| 2004/0002368 | A1 | | 1/2004 | Shinners et al. ................ 460/4 |

FOREIGN PATENT DOCUMENTS

| | | |
|---|---|---|
| DE | 267 650 | 5/1989 |
| DE | 195 24 752 | 1/1997 |
| EP | 0 208 025 | 1/1987 |
| EP | 0 853 234 A | 7/1998 |
| EP | 0 856 723 | 8/1998 |
| EP | 0 887 008 | 12/1998 |
| EP | 1 169 905 A | 1/2002 |
| WO | WO 85/00087 | 1/1985 |

* cited by examiner

*Primary Examiner*—Thomas B Will
*Assistant Examiner*—Alicia Torres

(57) ABSTRACT

A harvesting machine includes a measuring device for capturing the throughput of collected material. The measuring device has a measuring surface which acts together with the crop material and is supported movably at a support point in such a manner that its position depends on the throughput of the crop material, and an optical position capturing device for capturing the position of the measuring surface. Preferably the support point is a solid body articulation and the position capturing device is a laser interferometer.

3 Claims, 3 Drawing Sheets

HARVESTING MACHINE WITH A MEASURING DEVICE FOR CAPTURING THE THROUGHPUT OF COLLECTED CROP MATERIAL

FIELD OF THE INVENTION

The invention concerns a harvesting machine with a measuring device for capturing the throughput of collected crop material, with the measuring device including a measuring plate having a surface located for engagement by crop material, with the plate being supported movably at a support point in such a manner that its position depends on the throughput of the crop material, and an optical position capturing device for capturing the position of the measuring plate.

BACKGROUND OF THE INVENTION

Various different types of sensors are known for use in determining the yield in harvesters. Examples are baffles or rotating star feeders at the outlet of the grain elevator of a combine as disclosed in EP 0 208 025 A and U.S. Pat. No. 6,584,424B or baffles inside the delivery channel of a field chopper as disclosed in EP 0 887 008 A, weight sensors for capturing the weight acting on crop material carrying surfaces as disclosed in U.S. Pat. Nos. 4,407,380A, No. 5,318,475A, No. 5,959,257A, No. 6,066,809, and No. 6,313,414B, sensors for capturing the distance of prepress rollers as disclosed in DE 195 24 752 A, light barriers inside the combine elevator as disclosed in EP 0856 723 A, or radiometric absorption measurements at the elevator outlet as disclosed in WO 85/00087 A. In the case of mechanical sensors the crop material moves along a surface or strikes it, which generates forces, pulses or torque which can be transduced into electrical signals by potentiometers or according to EP 0 856 723 A by extensometers or optical displacement sensors. In DD 267 650 A a piezoelectric crystal is used for transforming the weight of the crop material acting upon it into an electrical signal.

By means of a speed measurement of the material the material throughput per time unit can then be determined. If the density of the crop material is known, the volumetric throughput can then be deducted.

The sensors mentioned have the disadvantage that additional elements need to be integrated into the harvester. Also, their accuracy and reliability is not always adequate in the highly dust and vibration impacted environment of a harvester.

SUMMARY OF THE INVENTION

The objective on which the invention is based is considered to be: to demonstrate a measuring device for capturing the throughput in a harvester which can be added without major constructive modifications and which features a high resolution.

It is proposed to make available a measuring plate having a surface disposed for being engaged by crop material, with the plate being supported by a solid body articulation. This articulation makes available a pre-stress force which pre-stresses the measuring plate into its home position and which permits at the same time small movements of the measuring plate. Crop material picked up or processed by the harvester exerts either, through its weight or a strike, a force, which may exert some torque on the measuring plate which is thereby directed against the pre-stress force. The movements of the measuring plate are in the range of nm, μm or single digit mm and are being captured by a sufficiently accurate position capturing device, preferably in the form of a laser interferometer or another optical absolute or incremental distance measuring system. In the event that for calculating the throughput, which may be the mass or volume throughput per time unit, any information is needed about the material speed, this may be determined directly, e.g. by radar or by applying the applicable conveyor speed in each case.

An advantage of the invention is that a mass flow rate can be captured with high resolution.

The measuring plate can be integrated into the wall of a conveyor channel through which the crop material is transported, which is to say that it may be formed by a wall section of the conveyor channel so that no additional elements need to be inserted into the conveyor channel.

The invention is particularly suitable for capturing the throughput on harvesters such as combines, mowers, field choppers, bale presses or self loading forage boxes or associated harvesting attachments, e.g. in the form of pick-ups, corn pickers or corn husking rolls or slitters. The measured throughput values can be charted with the geo-reference system.

BRIEF DESCRIPTION OF THE DRAWINGS

In the drawings are shown two versions of the invention which are described in more detail below.

DESCRIPTION OF THE PREFERRED EMBODIMENT

Figure 1:
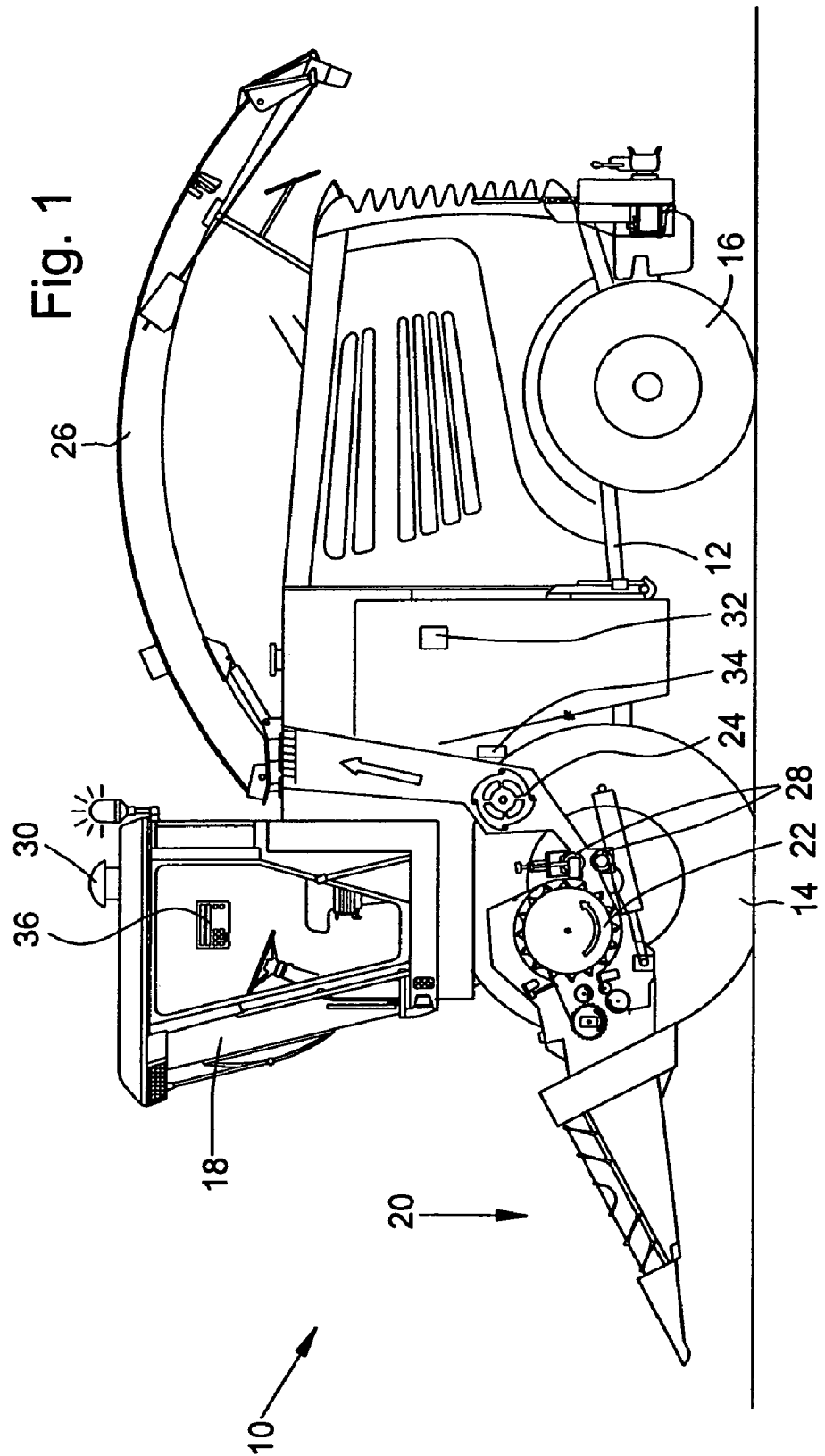
FIG. 1 is a harvesting machine in the form of a field chopper.

A harvesting machine is shown in FIG. 1 in the form of a self-propelled field chopper built on a frame 12 which is supported by the front and rear wheels 14 and 16. Operation of the harvester 10 is controlled from a driver's cabin 18 from which the crop picking device 20 is visible. Crop material, such as corn, grass or similar material that has been picked up from the ground by the crop material pick-up device 20 is directed to a chopping drum 22 which chops it into small pieces and sends it to a conveyor 24. The material exits the harvester 10 into an adjacent trailer or wagon by means of a rotatable discharge device 26. Between the chopping drum 22 and the conveyor device 24 is located a regrinding device 28 through which the material to be conveyed is brought tangentially to the conveyor device 24. In the following text indications of direction such as front and back refer to the forward movement of the harvester 10.

On the top of the driver's cab 18 an antenna 30 is mounted for receiving signals from satellites of the global positioning system (GPS), but any other positioning system may also be used. A computing device 32 is connected to the antenna 30 and a measuring device 34 which serves for capturing the throughput of the crop material through the harvester 10. Crop throughputs are stored in geo-reference as yield cards by the computing device 32 and are displayed to the operator on a display device 36.

Figure 2:
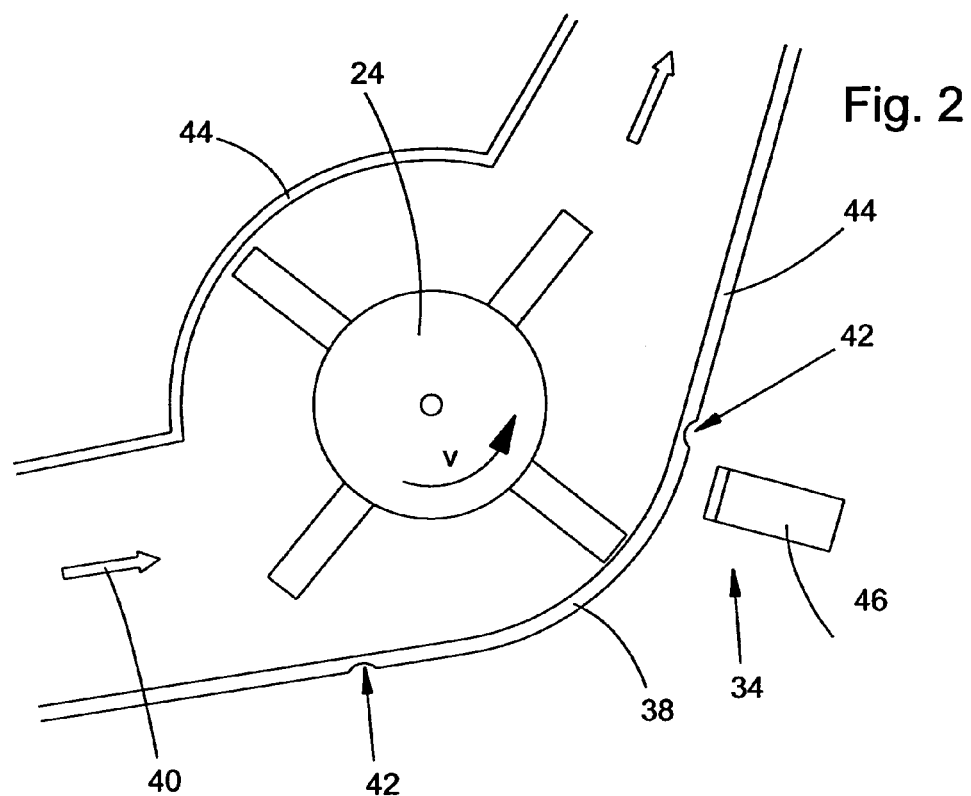
FIG. 2 is a schematic side view of a measuring device for the harvesting machine in FIG. 1.

The measuring device 34 forms the bottom and back wall of a conveyor channel formed by the housing 44 of the conveyor device 24 and is shown in detail in FIG. 2. It includes a measuring plate 38 having a concave surface curved at a radius about the conveyor device 24 and located so as to be engaged by crop material conveyed through the conveyor channel. The measuring plate 38 is made of rigid material (steel sheet) which is fastened at its front and rear ends (in reference to the flow direction of the material as shown by the arrow 40) by so-called solid body articulations 42 on the bottom and back wall of the housing 44. The solid body articulations 42 extend each over the entire width of the housing 44 or a portion thereof and are formed by sections of the wall of the housing 44 with a significantly reduced material thickness as compared to the rest of the housing. The manufacture of the solid body articulations 42 may be done through material removal or material deformation. The lateral edges of the measuring plate 38 may also be connected by solid body articulations to the adjacent wall of the housing 44 or a separating cut is provided there.

The solid body articulations 42 pre-stress the measuring plate 38 into a home position, but they allow, when crop material strikes the measuring surface 38, a microscopic movement of the measuring plate 38 with respect to the housing 44.

Depending on the material throughput, the rear section of the measuring plate 38 moves backwards, while the front section (running more or less horizontal) then moves downward. The movement of the measuring plate 38 is being captured by a laser interferometer 46 belonging to the measuring device 34 and which is connected to the computing device 32. The latter calculates the current throughput, based on the signal from the laser interferometer 46 and if applicable based on the speed signal relating to the revolution of the conveyor device 24. The laser interferometer is advantageously calibrated on a throughput of zero when no crop material is present; additional calibration points may be accepted with other crop throughputs known through other measurements (e.g. weighing of a trailer loaded with crop material). The zero calibration may be repeated by an operator input or automatically when no crop material is present which can be captured on the basis of the operating condition of the harvester or by suitable sensors. Suitable laser interferometers are known as such and are manufactured and marketed for instance by Carl Zeiss AG, Oberkochen, De under the name Surfcom 3000.

Measuring devices 34 as shown in FIG. 2 may be located at any position on harvesters where material changes direction, so that the measuring plate 38 experiences a force, a pulse or a torque caused by the striking crop material. On a harvester 10 in the form of a field chopper such a measuring device 34 could also be positioned on the top of the delivery device 26, preferably in its area that is nearest to the conveyor device 24. In the case of combine it could be a wall against which the clean grain is thrown by the grain elevator.

Figure 3:
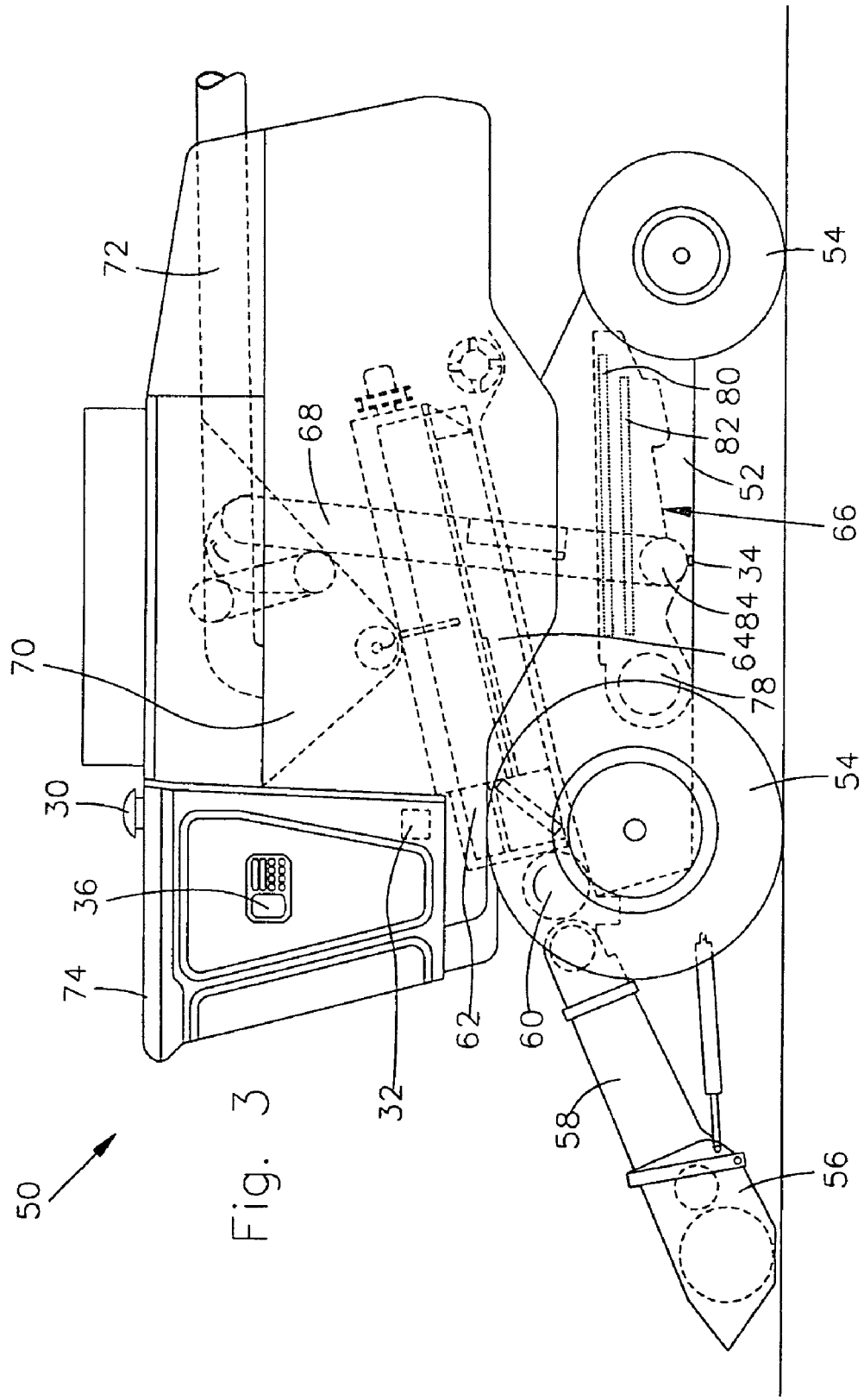
FIG. 3 is a harvesting machine in the form of a combine.

FIG. 3 shows another agricultural harvesting machine 50 in the form of a combine featuring a supporting structure 52 with wheels 54 engaged with the ground. A harvesting attachment 56 is used to pick up crop material and to direct it towards a slope conveyor. The harvested material is transported by the slope conveyor to a guide drum 60. The guide drum 60 transports the material upward through an intake transition section 62 of a rotatable material processing unit 64.

The material processing unit 64 threshes and separates the crop material. Grain and chaff fall through the grates at the bottom of the material processing unit 64 into a cleaning system 66. The cleaning system 66 eliminates the chaff and directs the clean grain to an elevator 68 for clean grain. The elevator 68 for clean grain deposits the clean grain in a grain container 70. The clean grain in the grain container 70 can be discharged through a discharge worm conveyor 72 to a grain wagon, trailer or truck. Operation of the harvester 50 is controlled from an operator cab 74.

Figure 4:
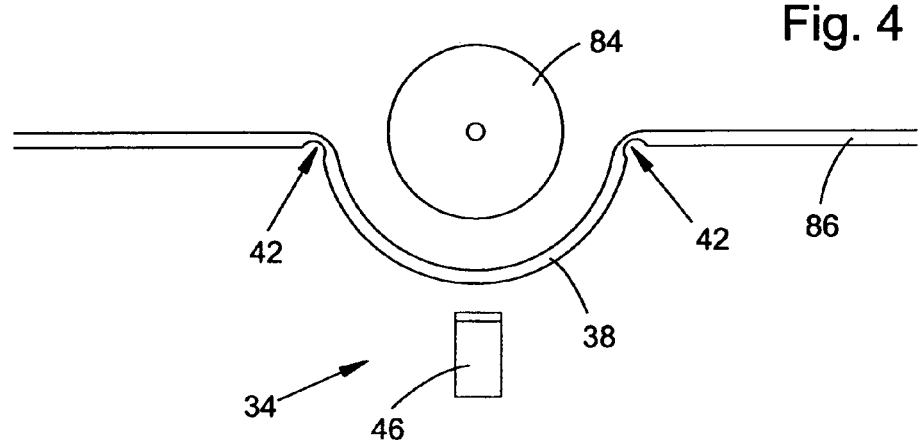
FIG. 4 is a schematic side view of a measuring device for the harvesting machine of FIG. 3.

The harvesting machine 50 is also equipped with a measuring device 34 which is shown in detail in FIG. 4, to capture the material throughput. An antenna 30, a computing device 32 and a display device 36 are also provided which in their construction and function correspond to the executed version of FIG. 1.

The components of the measuring device 34 shown in FIG. 4 correspond to those of the measuring device shown in FIG. 2. The measuring plate 38 is formed by the part of the bottom plate 86 of the screen box 66 which surrounds in a semicircular shape the cross-direction conveyor 84 and is connected to the bottom plate 86 by the solid body articulations 42. This area forms a conveying channel over the entire length (seen in a sideways direction) of the cross-direction conveyor 84 or partial area thereof and may be connected, at the left and right ends in the forward direction, by solid body articulations 42 to the bottom plate 86 or may be separated therefrom by separating cuts. The material (cleaned grain) transported by the plate 38 which will yield correspondingly in a downward direction, against the pre-stress force made available by the solid body articulations 42. The vertical position of the measuring plate 38 is being captured by the laser interferometer 46 that is connected to the computing device 32. To determine the throughput, the computing device 32 is connected to a sensor for measuring the revolutions of the cross-direction conveyor 84. To avoid measuring errors, in case harvesting machine 50 is working on a side slope, appropriate sensors for the incline in the forward and sideways direction may be present and on the basis of whose signals the computing device 32 performs appropriate corrections. The measuring device 34 could also be used on a cross-direction conveyor for the cross-over (not shown) or at the bottom of the grain container 70.

The measuring device 34 as per FIG. 4 may be used in any location where crop material is transported over a surface. Examples would be intake channels of bale presses, self loading forage boxes, or other harvesting machines or bottom plates of harvesting attachments.

The harvesting machines 10 and 50 are not stationary but are moved during operation across a field usually featuring some uneven spots. These relief variations, as do also any vibrations produced by working elements of harvesting machines 10, 50 (e.g. the engine or other rotating elements) lead also to accelerations of the measuring plate 38. Because of the relatively rigid suspension at the solid body articulation 42, the measuring plate 38 is subject to less pronounced natural vibrations than conventional measuring plates pre-stressed by a spring, whereby measuring accuracy is improved.

Should the vibrations of the measuring plate 38 be interfering in spite of this, the measuring plate can be mounted and dimensioned in such a manner that each interfering acceleration will be followed by an equally strong acceleration in reciprocal proportions. Over a longer period the measuring errors cancel each other out. Alternatively or additionally, a mechanical damper of the measuring plate 38 may be provided, for instance by a liquid bath or an additional mass, or the vibrations are compensated during the evaluation of the signals of the measuring device 34, in particular by filtering and/or averaging.

If a higher measuring accuracy is required, one could also use, instead of the measuring device 34 described so far which works in a single dimension, a version with as many as 6 measuring axes in order to determine all interfering accelerations and to be able to compensate for them through software during the computer-assisted evaluation. For a further increase of the measuring accuracy the principle of a measuring bridge could also be used. In addition to the position measuring device at the measuring plate 38 in this case an identical position measuring device is mounted to a reference system that is not integrated into the mass flow. This reference system should be located as close as possible to the actual measuring system. With this arrangement mechanical as well as thermal compensation of ambient influences is achieved. A part of the time-dependent changes in the mass flow system is also compensated.

Having described the preferred embodiment, it will become apparent that various modifications can be made without departing from the scope of the invention as defined in the accompanying claims.

The invention claimed is:

1. A harvesting machine having a conveying channel for conveying harvested crop material, and a measuring device for capturing the throughput of said crop material, said measuring device comprising: a measuring plate forming a segment of a wall of said conveying channel and having a surface which is located for being engaged by crop material passing through said conveying channel and said plate being movably supported by a solid body articulation defined by thinned wall sections provided at opposite ends of said measuring plate spaced from each other in a direction of movement of said crop material through said conveying channel and pre-stressing said measuring plate to a home position in such a manner that said measuring plate moves in response to said surface being engaged by said crop material with its position depending on the throughput of the crop material; and a position capturing device located for capturing the position of the measuring plate.

2. The harvesting machine as defined by claim 1, wherein the position capturing device is a laser interferometer.

3. The harvesting machine as defined by claim 1 wherein said measuring plate has an upper surface disposed such that the crop material flows along the upper surface of said measuring plate so that the measuring plate is impacted by the weight of the crop material and experiences a deflection.

* * * * *